(12) United States Patent
Panje et al.

(10) Patent No.: US 11,696,157 B2
(45) Date of Patent: Jul. 4, 2023

(54) ENHANCED CONFIGURING OF ELECTRONIC DEVICES IN A NETWORK

(71) Applicant: ARRIS Enterprises LLC, Suwanee, GA (US)

(72) Inventors: Krishna Prasad Panje, Karnataka (IN); Lakshmi Arunkumar, Karnataka (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 126 days.

(21) Appl. No.: 17/407,683

(22) Filed: Aug. 20, 2021

(65) Prior Publication Data

US 2022/0104032 A1    Mar. 31, 2022

Related U.S. Application Data

(60) Provisional application No. 63/084,215, filed on Sep. 28, 2020.

(51) Int. Cl.
*H04W 24/02* (2009.01)
*H04L 1/08* (2006.01)

(52) U.S. Cl.
CPC .............. *H04W 24/02* (2013.01); *H04L 1/08* (2013.01)

(58) Field of Classification Search
CPC ........ H04W 24/02; H04W 84/18; H04L 1/08; H04L 1/1803
See application file for complete search history.

(56) References Cited

U.S. PATENT DOCUMENTS

| | | | |
|---|---|---|---|
| 2016/0134469 A1* | 5/2016 | Carter | H04W 12/04 370/254 |
| 2018/0368058 A1* | 12/2018 | Huang | H04W 48/16 |
| 2019/0182666 A1* | 6/2019 | Kotay | H04W 48/18 |

* cited by examiner

*Primary Examiner* — Jae Y Lee
(74) *Attorney, Agent, or Firm* — Wenderoth, Lind & Ponack, L.L.P.

(57) ABSTRACT

An electronic device included in a network enhances the configuring of other electronic devices in the network. The electronic device includes a network interface, a non-transitory memory having instructions stored thereon, and a hardware processor. The hardware processor is configured to execute the instructions to transmit a first set of configuration data to another electronic device in the network, receive a message that the other electronic device was successfully configured using the first set of configuration data, and in response to the message transmit one or more next sets of configuration data to the other electronic device. Moreover, the hardware processor is configured to execute the instructions to receive a message that the other electronic device was not successfully configured using the first set of configuration data or the one or more next sets of configuration data and implement remedial action to address the unsuccessful configuration.

21 Claims, 3 Drawing Sheets

ENHANCED CONFIGURING OF ELECTRONIC DEVICES IN A NETWORK

TECHNICAL FIELD

The subject matter of the present disclosure relates generally to enhanced configuring of electronic devices in a network.

BACKGROUND

There has been a rapid rise in the use of wireless devices in wireless networks, which has increased traffic drastically, degraded the quality of service, and reduced the coverage capabilities of many network devices (e.g., gateway devices, access points, and wireless extenders). The wireless industry recognized these issues and developed standards for wireless routing protocols such as a multi-access point (MAP) or mesh protocol, which allows for wireless devices to communicate with each other using optimal paths for relaying data in the wireless network. The MAP or mesh protocol defines the control protocols and the data objects necessary to enable onboarding, provisioning, control, and management of wireless devices in a wireless network.

A wireless network implementing the MAP or mesh protocol (e.g., MAP or mesh network) generally includes the use of a MAP control device. Additionally, wireless management functions can be provided for the MAP control device for management of the MAP or mesh network to improve quality of experience (QoE) for users. For example, the MAP controller may configure, poll, and trigger responses from devices included in the network. In a typical MAP or mesh network, there can be multiple wireless extenders or access points along with the MAP control device at different places in order to have seamless coverage orchestrated by the MAP controller. The MAP controller typically runs on the gateway device but may also run on devices in the cloud.

Occasionally, when the MAP controller attempts to configure a wireless extender in the network, the configuration is not fully programmed in the wireless extender because certain data, for example, service set identifiers (SSID), special characters, and information regarding certain radio channels may not be properly received or processed. The wireless extender may not receive or process such data due to System on a Chip (SoC) issues or due to how the wireless extender manages stacks of data including the configuration data. Consequently, the wireless extender cannot communicate over the back haul and front haul so users are required to reinitiate onboarding of the wireless extender which is frustrating, time consuming and inconvenient. Therefore, known techniques for configuring wireless extenders included in a network have drawbacks.

Thus, it would be advantageous and an improvement over the relevant technology to provide an apparatus, method, and computer-readable recording medium capable of incrementally configuring the wireless extender with different sets of configuration data until the wireless extender is successfully configured.

SUMMARY

An aspect of the present disclosure provides an electronic device included in a network capable of enhancing the configuring of other electronic devices in the network. The electronic device includes a network interface, a non-transitory memory having instructions stored thereon, and a hardware processor. The hardware processor is configured to execute the instructions to transmit a first set of configuration data to another electronic device in the network, receive a message that the other electronic device was successfully configured using the first set of configuration data, and in response to the message transmit one or more sets of second configuration data to the other electronic device. Moreover, the hardware processor is configured to execute the instructions to receive a message that the other electronic device was not successfully configured using the first set of configuration data or the one or more sets of second configuration data, and implement remedial action to address the unsuccessful configuration.

In an aspect of the present disclosure the other electronic device is incrementally configured based on the first set of configuration data and each of the one or more second sets of configuration data until the other electronic device is completely configured.

In an aspect of the present disclosure the hardware processor further executes the instructions to transmit, using the network interface, an unsuccessful configuration message to a cloud-based device, wherein the cloud-based device implements the remedial action. The remedial action includes resetting the other electronic device and retransmitting the first set of configuration data to the other electronic device, retransmitting the first set of configuration data to the other electronic device, or modifying the first set of configuration data and transmitting the modified first set of configuration data to the other electronic device. In another aspect of the present disclosure the gateway device implements the remedial action.

In yet another aspect of the present disclosure the first set of configuration data includes back haul credentials and the second set of configuration data includes front haul credentials, basic service set configuration data, channel configuration data, or radio property configuration data.

An aspect of the present disclosure provides a method of enhancing of the configuring of electronic devices included in a network. The method includes transmitting, using an electronic device in the network, a first set of configuration data to another electronic device in the network. In response to receiving, using the electronic device, a message that the other electronic device was successfully configured using the first set of configuration data, the electronic device transmits one or more sets of second configuration data to the other electronic device. In response to receiving a message that the other electronic device was not successfully configured using the first set of configuration data or the one or more sets of second configuration data, the electronic device implements remedial action to address the unsuccessful configuration.

In an aspect of the present disclosure the other electronic device is incrementally configured based on the first set of configuration data and each of the one or more sets of second configuration data until the other electronic device is completely configured.

In another aspect of the present disclosure the remedial action includes transmitting, by the electronic device, an unsuccessful configuration message to a cloud-based device and implementing, using the cloud-based device, the remedial action to address the unsuccessful configuration. The remedial action includes resetting the other electronic device and retransmitting the first set of configuration data to the other electronic device, retransmitting the first set of configuration data to the other electronic device, or modifying the first set of configuration data and transmitting the modified first set of configuration data to the other electronic device. In another aspect of the present disclosure the gateway device implements the remedial action In another aspect of the present disclosure the first set of configuration data includes back haul credentials and each of the one or more sets of second configuration data includes front haul credentials, basic service set configuration data, channel configuration data, or radio property configuration data.

An aspect of the present disclosure provides a non-transitory computer-readable recording medium in an electronic device included in a network capable of enhancing configuration of other electronic devices included in the network. The non-transitory computer-readable recording medium stores instructions which when executed by a hardware processor performs the steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
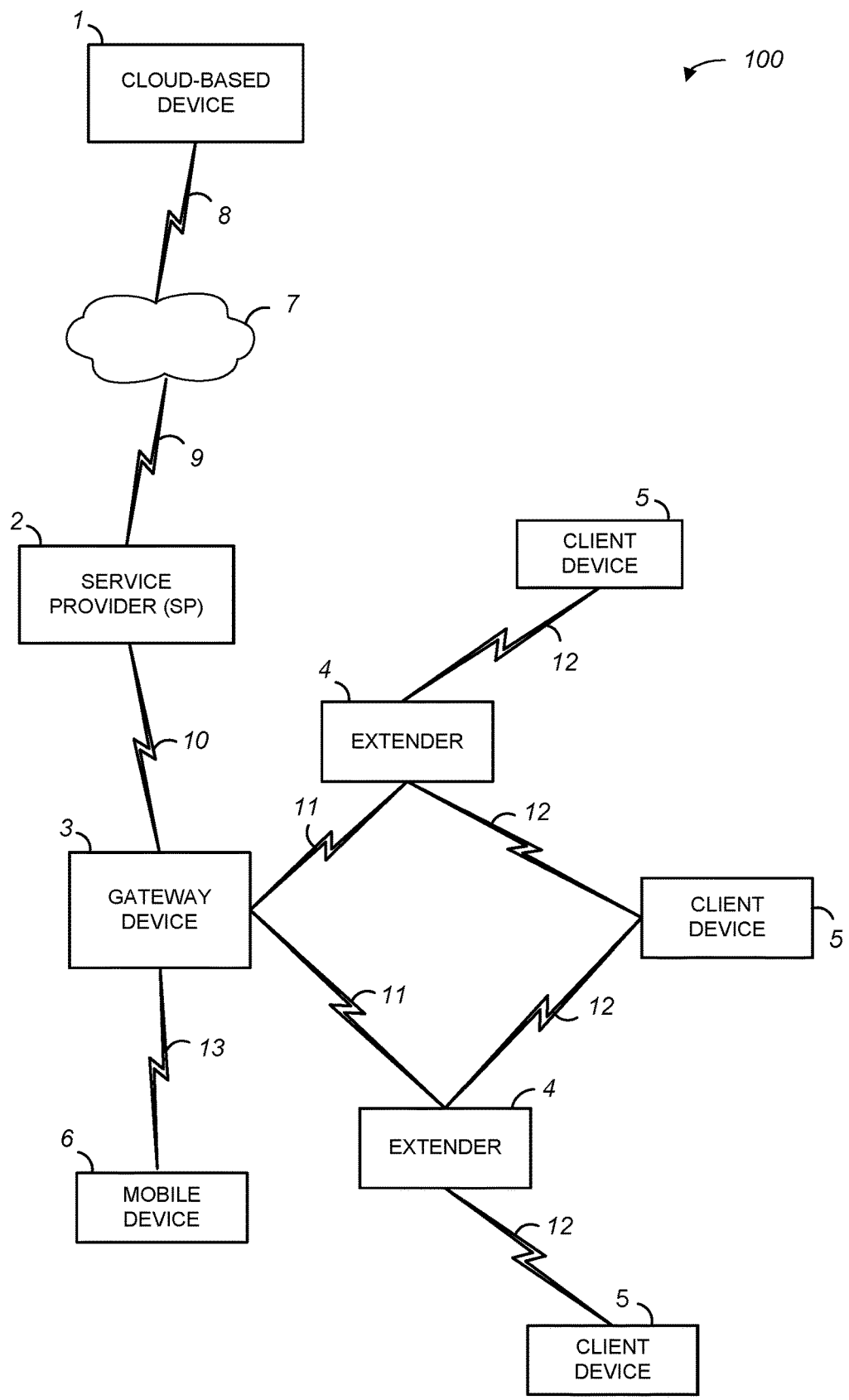
FIG. 1 is a schematic diagram illustrating an exemplary system for enhanced configuring of electronic devices in a network.

FIG. 1 is a schematic diagram of an exemplary system 100 for enhanced configuring of electronic devices in a network. As shown in FIG. 1, the main elements of the system 100 include a cloud-based device 1 and a service provider (SP) 2 communicatively connected via the Internet 7, as well as a gateway device 3 communicatively connected to the Internet 7 via the SP 2 and also connected to different wireless devices such as Wi-Fi extenders 4, client devices 5, and a mobile device 6.

The system 100 shown in FIG. 1 includes wireless devices (e.g., extenders 4, client devices 5, and mobile device 6) that may be connected in one or more wireless networks (e.g., private, guest, iControl, back haul, or Internet of things (IoT) networks) within the system 100. Additionally, there could be some overlap between devices in the different networks. That is, one or more network devices could be located in more than one network. For example, wireless extenders 4 could be located both in a private network for providing content and information to a client device and also included in a back haul.

In FIG. 1, the cloud-based device 1 can be, for example, a network server or personal computer (PC) having a network controller for assisting, if necessary, in the management (e.g., steering/roaming) of wireless devices in the system 100. The SP 2 can be, for example, a streaming video provider or any computer for connecting the gateway device 3 to the Internet 7.

The connection 8 between the cloud-based device 1 and the Internet 7, the connection 9 between the Internet 7 and the SP 2, and the connection 10 between the SP 2 and the gateway device 3 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 10 can further include as some portion thereof a broadband mobile phone network connection, an optical network connection, or other similar connections. For example, the connection 10 can also be implemented using a fixed wireless connection that operates in accordance with, but is not limited to, 3rd Generation Partnership Project (3GPP) Long Term Evolution (LTE) or 5G protocols.

The gateway device 3 is a hardware electronic device that performs the function of a stand-alone cable modem or a combination modem and gateway device that combines the functions of a modem, access point, and/or a router for providing received content to network devices (e.g., client devices 5, wireless extenders 4 and mobile device 6) in the system 100. It is also contemplated by the present disclosure that the gateway device 3 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The gateway device 3 is connected to the wireless extenders 4 via connection 11. The connection 11 between the gateway device 3 and the wireless extenders 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands.

Additionally, the connection 11 can be implemented using a wireless connection that operates in accordance with, but is not limited to, IEEE 802.11 protocol, RF4CE protocol, ZigBee protocol, Z-Wave protocol, or IEEE 802.15.4 protocol. It is also contemplated by the present disclosure that the connections 11 can include connections to a media over coax (MoCA) network. One or more of the connections 11 can also be a wired Ethernet connection.

The wireless extenders 4 can be, for example, hardware electronic devices such as access points used to extend the wireless network by receiving the signals transmitted by the gateway device 3 and rebroadcasting the signals to, for example, client devices 5, which may be out of range of the gateway device 3. The wireless extenders 4 can also receive signals from the client devices 5 and rebroadcast the signals to the gateway device 3 or other client devices 5.

The connection 12 between the wireless extenders 4 and the client devices 5 may be implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 12 may be implemented using a wireless connection that operates in accordance with, but is not limited to, RF4CE protocol, ZigBee protocol, Z-Wave protocol, or IEEE 802.15.4 protocol. Also, one or more of the connections 12 can also be a wired Ethernet connection.

The client devices 5 can be, for example, a hand-held computing device, a personal computer, an electronic tablet, a smart phone, smart speakers, an IoT device, an iControl device, or other similar wireless hand-held consumer electronic device capable of executing and displaying the content received through, for example, the gateway device 3. Additionally, the client devices 5 can be a TV, an IP/QAM STB or an SMD that is capable of decoding audio/video content, and playing over OTT or MSO provided content received through the gateway device 3.

The connection 13 between the gateway device 3 and the mobile device 6 may be implemented through a wireless connection that operates in accordance with, but is not limited to, IEEE 802.11 protocol. The connection 13 may also be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as a CBRS band, 2.4 GHz bands, 5 GHz bands, 6 GHz bands, or 60 GHz bands. The connection 13 between the gateway device 3 and the mobile device 6 may also be implemented through a WAN, a LAN, a VPN, MANs, WLANs, SANs, a DOCSIS network, a fiber optics network (such as FTTH, FTTX, or HFC), a PSDN, a global Telex network, or a 2G, 3G, 4G or 5G network, for example. The connection 13 can also be a wired Ethernet connection.

The mobile device 6 can be, for example, a hand-held computing device, a personal computer, a smartphone, an electronic tablet, an e-reader, a personal digital assistant (PDA), or a portable music player with smart capabilities that is capable of connecting to the Internet, cellular networks, and interconnect with other devices via Wi-Fi and Bluetooth protocols.

Figure 2:
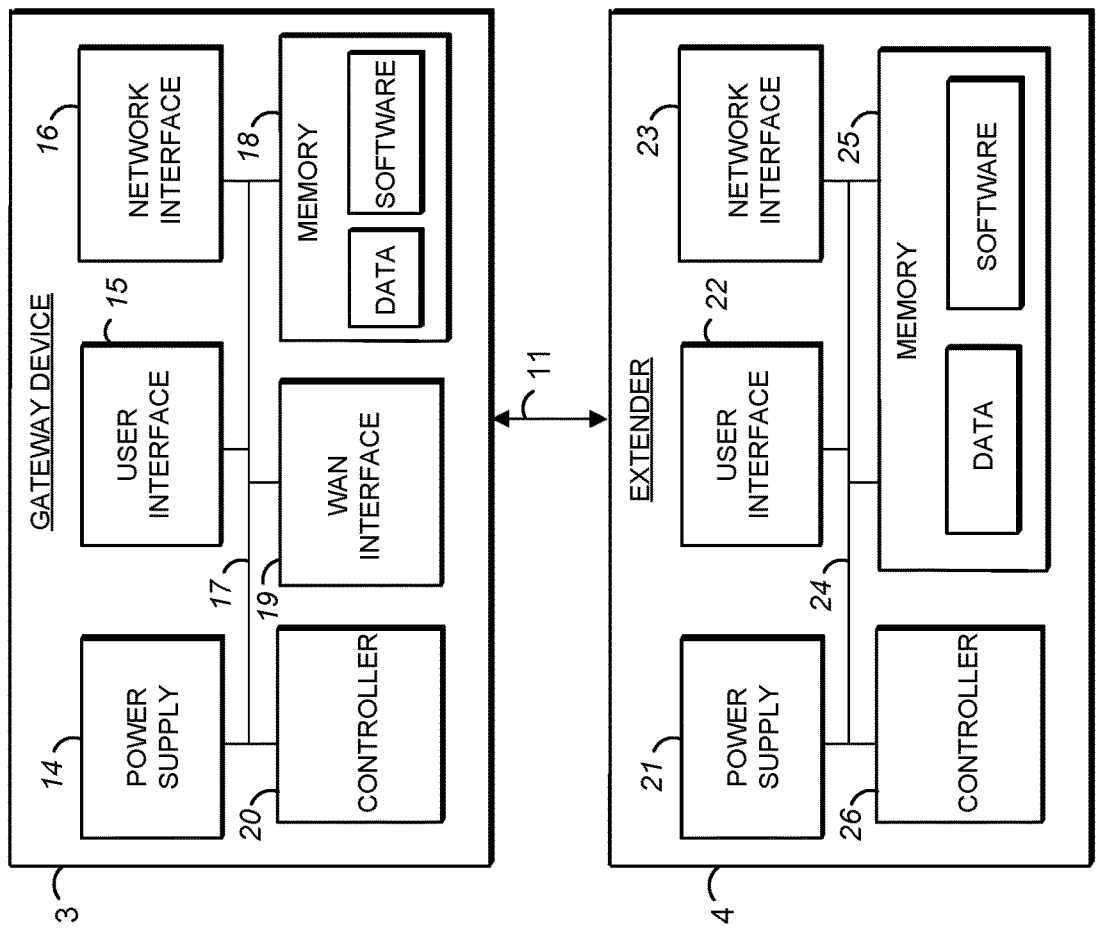
FIG. 2 is a more detailed schematic diagram illustrating an exemplary gateway device and an exemplary wireless extender in the system of FIG. 1.

A detailed description of the example internal components of the gateway device 3 and the wireless extenders 4 shown in FIG. 1 will be provided in the discussion of FIG. 2. However, in general, it is contemplated by the present disclosure that the gateway device 3 and the wireless extenders 4 include electronic components or electronic computing devices operable to receive, transmit, process, store, and/or manage data and information associated with the system 100, which encompasses any suitable processing device adapted to perform computing tasks consistent with the execution of computer-readable instructions stored in a memory or a computer-readable recording medium.

Further, any, all, or some of the computing devices in the gateway device 3 and the wireless extenders 4 may be adapted to execute any operating system, including Linux, UNIX, Windows, MacOS, DOS, and ChromeOS as well as virtual machines adapted to virtualize execution of a particular operating system, including customized and proprietary operating systems. It is contemplated by the present disclosure that the cloud-based device 1 has similar structure and functionality as the gateway device 3. The gateway device 3 and the wireless extenders 4 are further equipped with components to facilitate communication with other computing devices over the one or more network connections to local and wide area networks, wireless and wired networks, public and private networks, and any other communication network enabling communication in the system 100.

The respective connections 8, 9, 10 between the cloud-based device 1 and the Internet 7, between the Internet 7 and the SP 2, and between the SP 2 and the gateway device 3 shown in FIG. 1 are meant to be exemplary connections and are not meant to indicate all possible connections between the cloud-based device 1, the Internet 7, the SP 2, and the gateway device 3. Additionally, the connections 11 between the gateway device 3 and the wireless extenders 4 shown in FIG. 1 are meant to be exemplary connections and are not meant to indicate all possible connections between the gateway device 3 and the wireless extenders 4. Likewise, the connections 12 between the wireless extenders 4 and the client devices 5 shown in FIG. 1 are meant to be exemplary connections and are not meant to indicate all possible connections between the wireless extenders 4 and client devices 5. Similarly, the connection 13 between the gateway device 3 and the mobile device 6 shown in FIG. 1 is meant to be an exemplary connection and not meant to indicate all possible connections between the gateway device 3 and the mobile device 6.

It is contemplated by the present disclosure that the number of cloud-based devices 1, SPs 2, gateway devices 3, wireless extenders 4, client devices 5, and mobile devices 6 is not limited to the number of cloud-based devices 1, SPs 2, gateway devices 3, wireless extenders 4, client devices 5, and mobile devices 6 shown in FIG. 1.

FIG. 2 illustrates a more detailed schematic diagram of an example gateway device 3 and an example wireless extender 4 in the system 100 for enhanced configuring of electronic devices according to an embodiment of the present disclosure. Although FIG. 2 shows one wireless extender 4, the wireless extender 4 in the figure is meant to be representative of the other wireless extenders 4 shown in FIG. 1.

The gateway device 3 is a hardware electronic device that performs the function of a stand-alone cable modem or a combination modem and gateway device that combines the functions of a modem, access point and/or a router for providing received content to network devices (e.g., client devices 5, wireless extenders 4, and mobile device 6) in the system 100. It is also contemplated by the present disclosure that the gateway device 3 can include the function of, but is not limited to, an IP/QAM STB or SMD that is capable of decoding audio/video content, and playing OTT or MSO provided content. As shown in FIG. 2, the gateway device 3 includes a power supply 14, user interface 15, a network interface 16, a memory 18, a WAN interface 19, and a controller 20.

The power supply 14 supplies power to the internal components of the gateway device 3 through the internal bus 17. The power supply 14 can be a self-contained power source such as a battery pack with an interface to be powered through an electrical charger connected to an outlet (e.g., either directly or by way of another device).

The user interface 15 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the gateway device 3.

The network interface 16 includes various network cards, and circuitry implemented in software and/or hardware to enable communications using the communication protocols of connections 10, 11, and 13 (e.g., as previously described with reference to FIG. 1).

The memory 18 includes a single memory or one or more memories or memory locations that include, but are not limited to, a random access memory (RAM), a dynamic random access memory (DRAM), a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy.

The memory 18 can be used to store any type of data, including, but not limited to, configuration data used to configure electronic devices, for example, the wireless extenders 4 included in the system 100. The configuration data may be divided into any number of different sets of configuration data and stored as such in the memory 18. The different sets can be designated as, for example, a first set, a second set, a third set and so on depending on the total number of sets into which the configuration data is divided. Alternatively, the sets can be designated in any manner.

It is contemplated by the present disclosure that each different set of configuration data includes different data. The type of configuration data that may be included in a set includes, but is not limited to, back haul names and/or credentials, front haul credentials, guest network configuration data, channel parameter configuration data, basic configuration data such as basic service set data, configuration data for setting-up service set identifiers (SSID), and configuration data for restrictions and privileges. The sets of configuration data can be sequentially transmitted to any of the wireless extenders 4 included in the system 100 to facilitate incrementally configuring the respective wireless extender 4 until the respective wireless extender 4 is completely configured.

It is contemplated by the present disclosure that the initial sets of configuration data transmitted to a wireless extender 4 from the gateway device 3 can include information for the wireless extender 4 to perform basic operations such as communicating over the back haul and the front haul. Thus, the first set of configuration data may include back haul names and credentials and the second set of configuration data may include front haul credentials. If the configuring of the wireless extender is successful, the gateway device 3 can continue to incrementally transmit subsequent sets of configuration data until the wireless extender 4 is completely configured. For example, a third set of configuration data may include information regarding the guest network, a fourth set of configuration data may include information regarding channel parameters, a fifth set of configuration data may include information for setting the SSID, and the sixth set may include information regarding restrictions and privileges.

The gateway device 3 may transmit the sets of configuration data sequentially, that is, the first set may be transmitted first, the second set may be transmitted second and so on. Alternatively, the sets of configuration data may be transmitted in any order that best facilitates incrementally configuring the wireless extender 4 until the wireless extender is completely configured.

Additionally, the memory 18 can be used to store any type of instructions and/or software, for example, multi-access point (MAP) software or mesh protocol software or other similar software which allows for wireless devices to communicate with each other using optimal paths for relaying data in a wireless network. The MAP or mesh protocols define the control protocols and the data objects necessary to enable onboarding, provisioning, control, and management of wireless devices in a wireless network. Moreover, the memory 18 can be used to store instructions and/or software, for example simple network management protocol (SNMP) software or other software which enables the gateway device 3 to support the use of the same or similar protocol such as the SNMP protocol. Furthermore, the memory 18 can be used to store any type of instructions and/or software associated with algorithms, processes, or operations for controlling the general functions and operations of the gateway device 3.

It is contemplated by the present disclosure that the cloud-based device 1 has similar structure and functionality as the gateway device 3, as described with reference to FIG. 2. Thus, it should be appreciated that the cloud-based device 1 may store the same or similar data and software as the gateway device 3 which enable performing the same or substantially the same functions as the gateway device 3.

The WAN interface 19 may include various network cards and circuitry implemented in software and/or hardware to enable communications between the gateway device 3 and the Internet 7 via the SP 2 using communications protocols in accordance with connections 9 and 10 (e.g., as previously described with reference to FIG. 1).

The controller 20 controls the general operations of the gateway device 3 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 3. Communication between the components (e.g., 14-16 and 18-20) of the gateway device 3 is established using the internal bus 17.

The wireless extender 4 can be, for example, a hardware electronic device such as an access point used to extend the wireless network by receiving the signals transmitted by the gateway device 3 and rebroadcasting the signals to, for example, client devices 5, which may be out of range of the gateway device 3. The wireless extender 4 can also receive signals from the client devices 5 and rebroadcast the signals to the gateway device 3 or other client devices 5. As shown in FIG. 2, the wireless extender 4 includes a power supply 21, user interface 22, network interface 23, a memory 25, and a controller 26.

The power supply 21 supplies power to the internal components of the wireless extender 4 through an internal bus 24. The power supply 21 can be a self-contained power source such as a battery pack with an interface to be powered through an electrical charger connected to an outlet (e.g., either directly or by way of another device). The power supply 21 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 22 includes, but is not limited to, push buttons, a keyboard, a keypad, a LCD, a TFT, a LED, a HD or other similar display device including a display device having touch screen capabilities so as to allow interaction between a user and the wireless extender 4.

The network interface 23 includes various network cards, interfaces, and circuitry implemented in software and/or hardware to enable communications using the wireless protocols of connections 11 and 12 (e.g., as previously described with reference to FIG. 1).

The memory 25 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, a hard disk or any other various layers of memory hierarchy. The memory 25 can be used to store any type of data, for example, different sets of configuration data received from the gateway device 3 for incrementally configuring the wireless extender 4 until the wireless extender 4 is successfully configured. Additionally, the memory 25 may also be used to store any type of instructions and/or software associated with algorithms, processes, or operations for controlling the general functions and operations of the wireless extender 4.

The controller 26 controls the general operations of the wireless extender 4 and includes, but is not limited to, a CPU, a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the wireless extender 4. Communication between the components (e.g., 21-23, 25, and 26) of the wireless extender 4 is established using the internal bus 24.

Occasionally, when the gateway device 3 attempts to configure an electronic device, for example, a wireless extender 4 in the system 100 the configuration is not fully programmed in the wireless extender 4 because certain data, for example, service set identifiers (SSID), special characters, and information regarding certain radio channels may not be properly received or processed. As a result, the wireless extender 4 typically cannot communicate over the back haul and front haul so users are required to reinitiate onboarding of the wireless extender 4 which is frustrating, time consuming and inconvenient.

To address this problem, configuration data for configuring a wireless extender 4 in the system 100 can be divided into any number of different sets of configuration data which are used to incrementally configure the wireless extender 4 until the wireless extender is completely configured. The different sets can be designated as, for example, a first set, a second set, a third set and so on depending on the total number of sets into which the configuration data is divided.

More specifically, an electronic device, for example, the gateway device 3 in the system 100 transmits the first set of configuration data to another electronic device, for example, a wireless extender 4 in the system 100. In response to receiving a message that the wireless extender 4 was successfully configured using the first set of configuration data, the gateway device 3 transmits one or more sets of second configuration data to the wireless extender 4. However, in response to receiving a message that the wireless extender 4 was not successfully configured using the first set of configuration data or the one or more sets of second configuration data, the gateway device 3 implements a remedial action to address the unsuccessful configuration. As a result, user frustration and inconvenience caused by improper or failed electronic device configurations are facilitated to be reduced.

Figure 3:
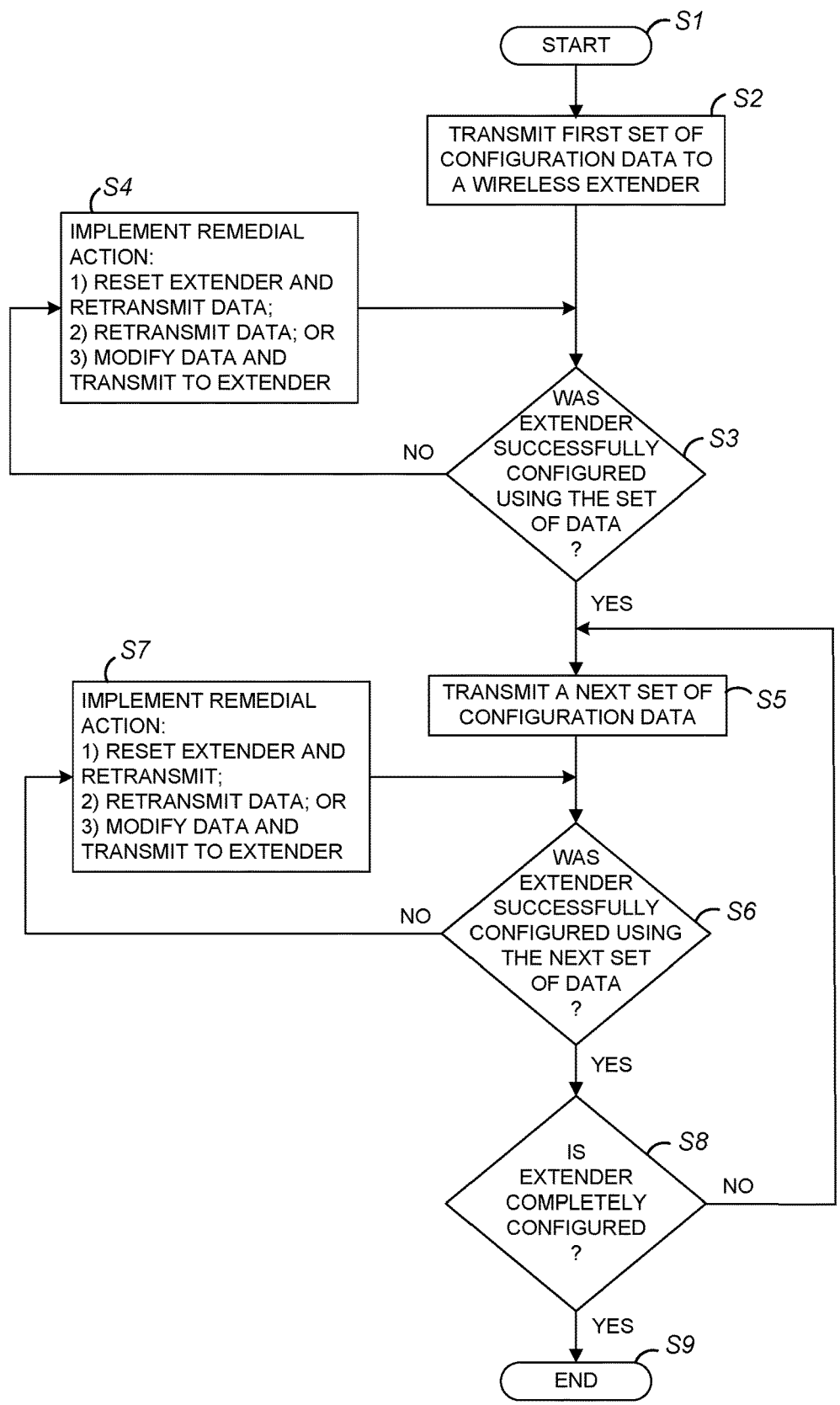
FIG. 3 is an exemplary method and algorithm for enhanced configuring of electronic devices in a network.

FIG. 3 is an exemplary method and algorithm for enhanced configuring of electronic devices in the system 100 in accordance with an embodiment of the present disclosure. Additionally, the exemplary method and algorithm of FIG. 3 includes operations that are performed by the software executed by the controller 20 of the gateway device 3 and by the controller 26 of the wireless extender 4.

The method and algorithm of FIG. 3 starts in step S1 and then in step S2, the software executed by the controller 20 of the gateway device 3 causes the gateway device 3 to transmit a first set of configuration data to a wireless extender 4 using the network interface 16 and the connection 11.

It is contemplated by the present disclosure that the configuration data for configuring a wireless extender 4 can be divided into any number of different sets of configuration data. The different sets can be designated as, for example, a first set, a second set, a third set and so on depending on the total number of sets into which the configuration data is divided. Moreover, it is contemplated by the present disclosure that each different set of configuration data includes different data.

The type of configuration data that may be included in a set includes, but is not limited to, back haul names and/or credentials, front haul credentials, guest network configuration data, channel parameter configuration data, basic configuration data such as basic service set data, configuration data for setting-up service set identifiers (SSID), and configuration data for restrictions and privileges. The sets of configuration data can be sequentially transmitted to any of the wireless extenders 4 included in the system 100 to facilitate incrementally configuring the respective wireless extender 4 until the respective wireless extender 4 is completely configured.

It is contemplated by the present disclosure that the initial sets of configuration data transmitted to a wireless extender 4 from the gateway device 3 can include information for the wireless extender to perform basic operations such as communicating over the back haul. Thus, the first set of configuration data may include, for example, back haul names and credentials whereas the second set of configuration data may include, for example, front haul credentials. If the configuring of a wireless extender 4 by the configuration data is successful, the gateway device 3 can continue to incrementally transmit subsequent sets of configuration data until the wireless extender 4 is completely configured. For example, a third set of configuration data may include, for example, information regarding the guest network, a fourth set of configuration data may include information regarding channel parameters, a fifth set of configuration data may include information for setting the SSID, and a sixth set of configuration data may include information regarding restrictions and privileges. The sets of configuration data may alternatively include different data.

The gateway device 3 may transmit the sets sequentially, that is, the first set may be transmitted first, the second may be transmitted second, and so on. Alternatively, the sets may be transmitted in any order that best facilitates incrementally configuring the wireless extender 4 until the wireless extender is completely configured.

The software executed by the controller 26 of the wireless extender 4 causes the wireless extender 4 to attempt to configure itself according to the first set of configuration data. If successful, the wireless extender 4 transmits a message indicating the configuration was successful to the gateway device 3 using the network interface 23 and the controller 11. If not, the transmitted message indicates the configuration was unsuccessful.

Next, in step S3, the software executed by the controller 20 of the gateway device 3 causes the gateway device 3 to determine whether or not the wireless extender 4 was successfully configured using the first set of configuration data. More specifically, in step S3, the gateway device 3 determines whether the message from the wireless extender 4 indicated the configuration was successful or not.

When the configuration was unsuccessful, in step S4, the gateway device 3 implements a remedial action to facilitate successfully configuring the wireless extender 4 according to the first set of configuration data. The remedial action may include, but is not limited to: 1) resetting the wireless extender 4 and retransmitting the first set of configuration data to the wireless extender 4 using the network interface 16 and the connection 11; 2) retransmitting the first set of configuration data to the wireless extender 4 using the network interface 16 and the connection 11; or, 3) modifying the first set of configuration data and transmitting the modified set of configuration data to the wireless extender 4 using the network interface 16 and the connection 11. The configuration data may be modified in any manner, for example, by removing corrupted data.

Because the cloud-based device 1 has similar structure and functionality as the gateway device 3, it is contemplated by the present disclosure that the gateway device 3 may alternatively transmit a message to the cloud-based device 1 indicating the configuration was unsuccessful using the network interface 16 and the connection 11. After receipt of the message, the cloud-based device 1 may alternatively implement the remedial action.

In response to receiving the set of configuration data transmitted as a result of the remedial action, the wireless extender 4 attempts to configure itself according to the transmitted set of configuration data.

However, when the configuration was successful, in step S5, the gateway device 3 transmits a second set of configuration data, for example, the second set of configuration data to the wireless extender 4 using the network interface 16 and the connection 11. Next, in step S6, the gateway device 3 determines whether or not the wireless extender 4 was successfully configured using the next set of configuration data.

When the configuration was unsuccessful, in step S7, the gateway device 3 implements one of the remedial actions to facilitate successfully configuring the wireless extender 4 according to the next set of configuration data. In response to receiving the set of configuration data transmitted as a result of the remedial action, the wireless extender 4 attempts to configure itself according to the transmitted set of configuration data.

However, when the configuration was successful, in step S8, the gateway device 3 determines whether or not the wireless extender 4 has been completely configured. The wireless extender 4 is completely configured after being successfully incrementally configured in accordance with each different set of configuration data. If the wireless extender 4 is not completely configured, in step S5, the gateway device 3 transmits a next set of configuration data, for example, a third set of configuration data to the wireless extender 4 using the network interface 16 and the connection 11. However, if the wireless extender 4 is completely configured, in step S9, the method and algorithm end.

Although the gateway device 3 is described herein as enhancing configuration of any wireless extender 4 included in the system 100, it is contemplated by the present disclosure that the cloud-based device 1 may likewise configure any wireless extender 4 in the system 100 because the cloud-based device 1 has similar structure and functionality as the gateway device 3. It is contemplated by the present disclosure that the cloud-based device 1 may store the same or similar data and software as the gateway device 3 which enable performing the same or substantially the same functions as the gateway device 3, including, for example, implementing the remedial actions. Moreover, instead of communicating with the wireless extenders 4 through the gateway device 3, the cloud-based device 1 may communicate directly with the wireless extenders 4. Although the gateway device 3 or the cloud-based device 1 implement the remedial actions as described herein, it is contemplated by the present disclosure that a user operating an electronic device, for example, a wireless extender 4 may alternatively implement the remedial action.

Using the methods and algorithms for enhancing configuration of an electronic device included in a system facilitates reducing the frustration, inconvenience, and wasted time suffered by users caused by failure of automatic configuration of electronic devices and then reinitiating onboarding of the wireless extender by users.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIG. 3. For example, the one or more memories stores software or algorithms with executable instructions and the one or more processors can execute a set of instructions of the software or algorithms in association with onboarding of wireless extenders in the wireless residential network.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. An electronic device included in a network capable of enhancing configuration of other electronic devices in the network comprising:
    a network interface;
    a non-transitory memory having instructions stored thereon; and
    a hardware processor configured to execute the instructions to:
    transmit, using the network interface, a first set of configuration data to another electronic device in the network;
    receive, using the network interface, a message that the other electronic device was successfully configured using the first set of configuration data;
    in response to the message, transmit, using the network interface, one or more sets of second configuration data to the other electronic device;
    receive, using the network interface, a message that the other electronic device was not successfully configured using the first set of configuration data or the one or more sets of second configuration data; and
    in response to the message that the other electronic device was not successfully configured, implement remedial action to address the unsuccessful configuration.

2. The electronic device according to claim 1, wherein the other electronic device is incrementally configured based on the first set of configuration data and each of the one or more next sets of configuration data until the other electronic device is completely configured.

3. The electronic device according to claim 1, wherein the hardware processor is further configured to execute the instructions to transmit, using the network interface, an unsuccessful configuration message to a cloud-based device, wherein the cloud-based device implements the remedial action.

4. The electronic device according to claim 3, wherein the remedial action comprises:
    resetting the other electronic device and retransmitting the first set of configuration data to the other electronic device;
    retransmitting the first set of configuration data to the other electronic device; or
    modifying the first set of configuration data and transmitting the modified first set of configuration data to the other electronic device.

5. The electronic device according to claim 1, wherein the remedial action comprises:
    resetting the other electronic device and retransmitting the first set of configuration data to the other electronic device;
    retransmitting the first set of configuration data to the other electronic device; or
    modifying the first set of configuration data and transmitting the modified first set of configuration data to the other electronic device.

6. The electronic device according to claim 1, wherein the first set of configuration data comprises back haul credentials.

7. The electronic device according to claim 1, wherein each of the one or more sets of second configuration data comprises:
    front haul credentials;
    basic service set configuration data;
    channel configuration data; or
    radio property configuration data.

8. A method of enhanced configuration of electronic devices included in a network comprising:
    transmitting, using an electronic device in the network, a first set of configuration data to another electronic device in the network;
    in response to receiving, using the electronic device, a message that the other electronic device was successfully configured using the first set of configuration data, transmitting one or more sets of second configuration data to the other electronic device; and
    in response to receiving a message that the other electronic device was not successfully configured using the first set of configuration data or the one or more sets of second configuration data, implementing remedial action to address the unsuccessful configuration.

9. The method according to claim 8 further comprising incrementally configuring the other electronic device based on the first set of configuration data and each of the one or more second sets of configuration data until the other electronic device is completely configured.

10. The method according to claim 8, wherein the remedial action comprises:
    transmitting, by the electronic device, an unsuccessful configuration message to a cloud-based device; and
    implementing, using the cloud-based device, the remedial action to address the unsuccessful configuration.

11. The method according to claim 10, wherein the remedial action comprises:
    resetting the other electronic device and retransmitting the first set of configuration data to the other electronic device;
    retransmitting the first set of configuration data to the other electronic device; or
    modifying the first set of configuration data and transmitting the modified first set of configuration data to the other electronic device.

12. The method according to claim 8, wherein the remedial action comprises:
- resetting the other electronic device and retransmitting the first set of configuration data to the other electronic device;
- retransmitting the first set of configuration data to the other electronic device; or
- modifying the first set of configuration data and transmitting the modified first set of configuration data to the other electronic device.

13. The method according to claim 8, the transmitting the first set of configuration data to the other electronic device comprising transmitting back haul credentials to the other electronic device.

14. The method according to claim 8, wherein each of the one or more sets of second configuration data comprises:
- front haul credentials;
- basic service set configuration data;
- channel configuration data; or
- radio property configuration data.

15. A non-transitory computer-readable recording medium in an electronic device for enhancing configuration of electronic devices included in a network, the network communicatively connecting the electronic device and one or more other electronic devices, the non-transitory computer-readable recording medium storing instructions which when executed by a hardware processor cause the non-transitory recording medium to perform steps comprising:
- transmitting a first set of configuration data to another electronic device in the network;
- in response to receiving a message that the other electronic device was successfully configured using the first set of configuration data, transmitting one or more sets of second configuration data to the other electronic device; and
- in response to receiving a message that the other electronic device was not successfully configured using the first set of configuration data or the one or more sets of second configuration data, implementing remedial action to address the unsuccessful configuration.

16. The non-transitory computer-readable recording medium according to claim 15, further comprising incrementally configuring the other electronic device based on the first set of configuration data and each of the one or more second sets of configuration data until the other electronic device is completely configured.

17. The non-transitory computer-readable recording medium according to claim 15, wherein the remedial action comprises:
- transmitting an unsuccessful configuration message to a cloud-based device; and
- implementing, using the cloud-based device, the remedial action to address the unsuccessful configuration.

18. The non-transitory computer-readable recording medium according to claim 17, wherein the remedial action comprises:
- resetting the other electronic device and retransmitting the first set of configuration data to the other electronic device;
- retransmitting the first set of configuration data to the other electronic device; or
- modifying the first set of configuration data and transmitting the modified first set of configuration data to the other electronic device.

19. The non-transitory computer-readable recording medium according to claim 15, wherein the remedial action comprises:
- resetting the other electronic device and retransmitting the first set of configuration data to the other electronic device;
- retransmitting the first set of configuration data to the other electronic device; or
- modifying the first set of configuration data and transmitting the modified first set of configuration data to the other electronic device.

20. The non-transitory computer-readable recording medium according to claim 15, wherein the first set of configuration data comprises back haul credentials.

21. The non-transitory computer-readable recording medium according to claim 15, wherein each of the one or more sets of second configuration data comprises:
- front haul credentials;
- basic service set configuration data;
- channel configuration data; or
- radio property configuration data.

* * * * *